(12) United States Patent
Ricks (10) Patent No.: US 7,644,625 B2
(45) Date of Patent: Jan. 12, 2010

(54) DIFFERENTIAL PRESSURE SENSE DIE BASED ON SILICON PIEZORESISTIVE TECHNOLOGY

(75) Inventor: Lamar F. Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/956,811

(22) Filed: Dec. 14, 2007

(65) Prior Publication Data

US 2009/0151464 A1 Jun. 18, 2009

(51) Int. Cl.
*G01L 7/00* (2006.01)

(52) U.S. Cl. .......................................... 73/756; 438/108

(58) Field of Classification Search ................... 73/756; 257/659; 438/108
See application file for complete search history.

(56) References Cited

U.S. PATENT DOCUMENTS

| | | | |
|---|---|---|---|
| 5,591,679 A * | 1/1997 | Jakobsen et al. .............. 438/51 |
| 6,229,190 B1 * | 5/2001 | Bryzek et al. ................ 257/419 |
| 6,945,120 B1 | 9/2005 | Marcus et al. ................. 73/756 |
| 7,073,375 B2 | 7/2006 | Parker et al. ................ 73/118.1 |
| 7,077,008 B2 * | 7/2006 | Pham et al. .................... 73/716 |
| 7,216,547 B1 * | 5/2007 | Stewart et al. ................ 73/756 |
| 2006/0000288 A1 * | 1/2006 | Pham et al. .................... 73/716 |
| 2008/0105057 A1 * | 5/2008 | Wade .......................... 73/721 |

* cited by examiner

*Primary Examiner*—Andre J Allen
(74) *Attorney, Agent, or Firm*—Luis M. Ortiz; Kermit D. Lopez (57) ABSTRACT

A method and apparatus for designing a differential pressure sense die based on a unique silicon piezoresistive technology for sensing low differential pressure in harsh duty applications is disclosed. The pressure sense die comprises of an etched pressure diaphragm and a hole that is drilled through the sense die wherein the pressure sense die possess a backside and a front side and are associated with varying pressures. A top cap can be attached to the front side and an optional constraint for stress relief can be attached to the backside of the differential pressure sense die. The top cap and the constraint comprise of glass and/or silicon and can be attached with an anodic bonding process or glass frit process.

18 Claims, 6 Drawing Sheets

DIFFERENTIAL PRESSURE SENSE DIE BASED ON SILICON PIEZORESISTIVE TECHNOLOGY

TECHNICAL FIELD

Embodiments are generally related to sensor methods and systems. Embodiments are also related to differential back pressure sensors. Embodiments are additionally related to differential pressure sense die designs for sensing low differential pressures with respect to a high common mode pressure.

BACKGROUND OF THE INVENTION

EGR (Exhaust Gas Recirculation) systems are employed in automotive vehicles in order to help reduce various engine emissions. Such systems typically employ an EGR valve that is disposed between the engine exhaust manifold and the engine intake manifold, and operable, when in an open position, to re-circulate a portion of the exhaust gases from the exhaust side of the engine back to the intake side. The amount of exhaust gas re-circulation (EGR) is determined by the EGR valve, which is controlled by the engine computer. A typical EGR valve configuration using vacuum control utilizes an electrically actuated vacuum regulator (EVR) and a differential pressure sensor.

High-pressure differential pressure sensors are commonly utilized to monitor fluid and gas pressures such as, for example, petroleum products, hydraulic braking, steam, radiator, air conditioning pump, boiler pressure, and so forth. Pressure sensors typically include a sensor die having a piezoelectric network mounted on a silicon diaphragm that flexes in response to the differential pressure. The sensor die converts the degree of flexing to an electrical signal.

The majority of prior art sensors are based on a single pressure die wherein a topside of the pressure die being exposed to one sensed media and a backside of the pressure die is exposed to a different sensed media. These sensors utilize a common diaphragm, which provides high performance and high accuracy to sense low differential pressures. However, the problem associated with this type of configuration is that the wire bond pads and the topside of the sense die have to be exposed to the sensed media. As a result, the sensed media touches the wirebonds, wirebond pads and the top side of the pressure die which possesses a protective passivation layer to prevent mechanical damage, contamination etc. The sensed media is usually corrosive so that the sensing elements, wirebonds and wirebond pads can be isolated from direct contact with the sensed media for reliable operation.

Some prior art sensors utilize dual pressure die where the sensed media touches only the backside of both pressure die which is very robust with respect to media compatibility, reliability, etc. The problem associated with this configuration is that the sensors utilize two separate pressure diaphragms and the ability to achieve high accuracy of sensing low differential pressures over temperature is limited. Each pressure die exhibits its own unique characteristics such as thermal coefficient of offset and thermal coefficient of gain. Therefore each pressure die provides a unique transfer function and the outputs do not match over temperature, which limits the sensor performance.

Based on the foregoing it is believed that a need exists for an improved unique differential pressure die design for detecting very low differential pressure with respect to a high common mode pressure. It is believed that by utilizing the pressure sensor described in greater detail herein, a low differential pressure can potentially be sensed in a much more efficient and cost-effective manner than prior art devices.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensor method and system.

It is another aspect of the present invention to provide for an improved differential pressure sensor that utilizes a configuration based on the use of a single silicon piezoresistive pressure die.

The aforementioned aspects and other objectives and advantages can now be achieved as described herein. A method and apparatus are disclosed in which differential pressure sense die can be designed, configured and implemented based on a unique silicon piezoresistive technology for sensing low differential pressure in harsh duty applications. The pressure sense die discussed herein generally includes an etched pressure diaphragm and a hole that is drilled through the sense die. The pressure sense die possess a backside and a front side and can be associated with varying pressures. A top cap can be attached to the front side and an optional constraint for stress relief can be attached to the backside of the differential pressure sense die. The top cap and the optional constraint can include glass and/or silicon and can be attached with an anodic bonding process or glass frit process, depending upon design considerations.

The sensed media can be applied to the pressure sense die. The top cap associated with the front side of the pressure sense die prevents wire bonds and active regions from exposure to sensed media and attack from acids and abrasive chemicals associated with the sensed media. The wire bond pads can be utilized for electrical connection of the resistive thin films and the pressure sense die through electrical conductive leads. The pressure sense die can be bonded to a substrate with standard die attach materials and microelectronic packaging processes in order to yield a high performance differential pressure sensor.

Such a sensor can be adapted for use in EGR (Exhaust Gas Recirculation) systems and devices utilized in associate with, for example, automotive gasoline engines. Such a sensor can also be utilized for measuring differential pressure across diesel particulate filters and/or applications in which differential pressure is required for system control and/or monitoring purposes. The differential pressure sense die disclosed herein can therefore sense the low differential pressures on a high common mode pressure on automotive engines and other mechanical and/or electromechanical devices and machines.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
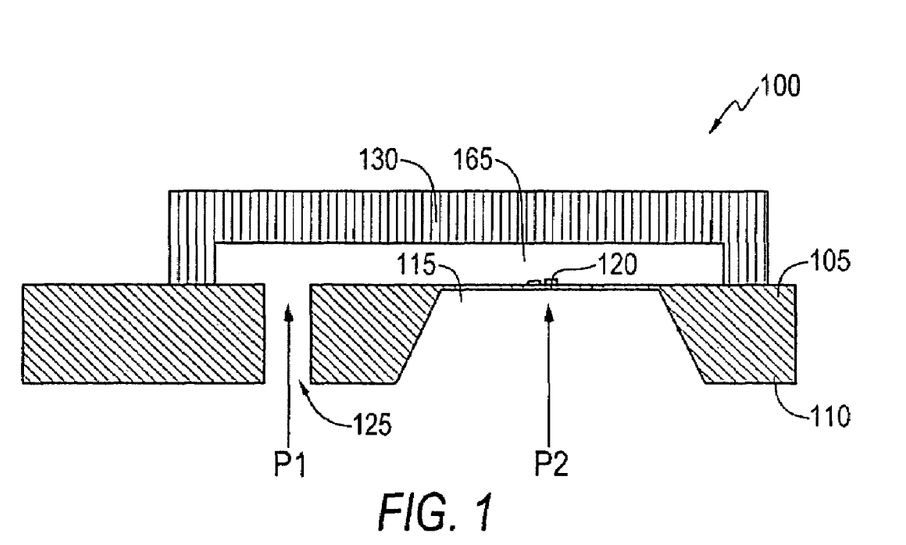
FIG. 1 illustrates a cross sectional view of single differential pressure sense die with a top cap, which can be adapted for use in implementing a preferred embodiment.

A differential micromachined pressure sense die utilizing silicon piezoresistive technology is disclosed herein. In such a device, a differential pressure sensor with high isolation between the sensed media and the sensor's electronics can be implemented. Such a sensor can be utilized, for example, to sense the exhaust pressure on automotive engines. Referring to FIG. 1, a cross sectional view of single differential pressure sense die 100 with a hole is illustrated, in accordance with a preferred embodiment. Note that in FIGS. 1-6, identical or analogous parts or elements are generally indicated by identical reference numerals. The sense die 100 generally includes a front side 105 and a backside 110.

A diaphragm 115 can be etched from the pressure sense die 100 such that one or more piezoresistors 120 can be located on micromachined pressure sense die 100. A separate hole 125 can be etched or drilled through the pressure sense die 100. The sense die 100 can be configured generally above pressure inlets as indicated by arrow P1 and P2. The sense or sensor die 100 can be micromachined from silicon. The sensor die 100 can also be configured to incorporate a Wheatstone bridge circuit configuration, referred to simply as a "Wheatstone bridge". One or more piezoresistors (e.g., 4 piezoresistors) such as piezoresistors 120 can be embedded in diaphragm 115 at locations that maximize the output of the sensor's Wheatstone bridge (not shown).

A top cap 130 made of glass or silicon can be attached to the front side 105 of the pressure sense die 100 with an anodic bonding process or glass frit process. The pressure sense die 100 together with the top cap 130 forms a reference pressure cavity 165. The top cap 130 can be bonded to the sense die 100 utilizing well-known bonding approaches.

For example, an electrostatic or anodic bond can be obtained when silicon and glass such as, for example, borosilicate glass having low expansion properties are placed together and exposed to a combination of heat and voltage. The voltage enables the free oxygen to molecularly bond to the underlying silicon. The silicon dioxide films are ordinarily removed from the silicon regions being anodically or electrostatically bonded. As shown in FIG. 1 a first pressure is applied to the sense die through hole 125 as indicated by arrow P1. A second pressure P2 can be applied to the back side 110 of the sensor die 100. On the other hand, the sense die 100 can also communicate with the outside (e.g., through the hole 125), so that the pressure P1 can be utilized as a reference-pressure.

Figure 2:
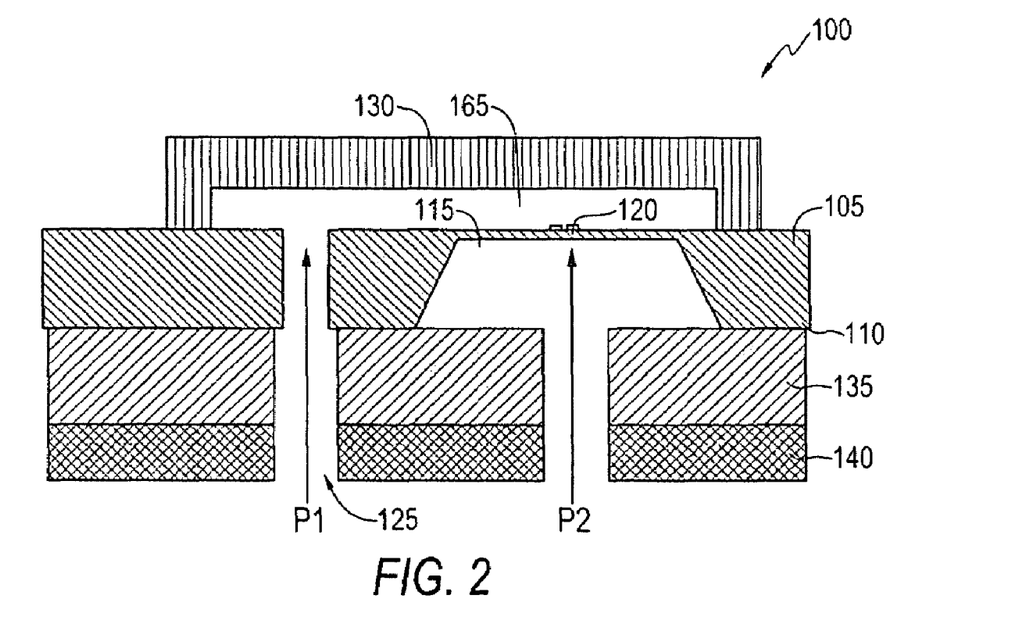
FIG. 2 illustrates a cross sectional view of single differential pressure sense die with a constraint, in accordance with a preferred embodiment.

Referring to FIG. 2 a cross sectional view of single differential pressure sense die 100 with a constraint 135 is illustrated, in accordance with a preferred embodiment. A constraint 135 made of glass or silicon can be attached to the back side 110 of the pressure sense die 100 for stress relief with an anodic bonding process or glass frit process. The constraint 135 can at least partially aligned with hole 125, which provides stress isolation to the diaphragm 115 and the pressure sense die 100. The hole 125 allows pressure sensor die 100 to act as a differential pressure sensor. However, those of skill in the art will recognize that by using a custom substrate, such as substrate 140 and by drilling a hole 125, the method described herein can be utilized to fabricate a differential pressure sensor package.

Figure 3:
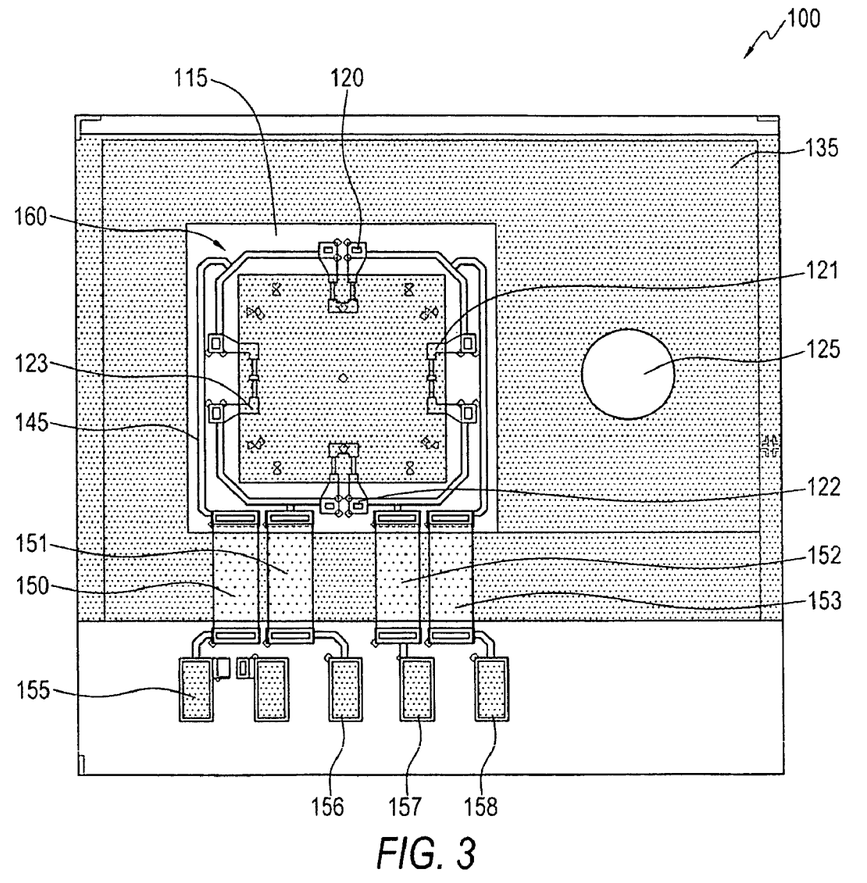
FIG. 3 illustrates a top view of single differential pressure sense die, in accordance with a preferred embodiment.

Referring to FIG. 3, a top view of a single differential pressure sense die 100 is illustrated, in accordance with a preferred embodiment. A piezoelectric pressure sensing network 160 can be formed as an integral part of the pressure sense die 100 to sense flexing of the diaphragm 115 and produce an electrical signal in response thereto. The piezoelectric network 160 includes four piezoresistors 120, 121, 122 and 123, electrical conductive lead or conductor 145, and electrical conductors 150, 151, 152 and 153. Electrical connection can be provided for connecting the piezoresistors 120, 121, 122 and 123 to circuitry connection sites for associated sensor circuitry. Conductor 145 can be embedded in the die 100 to connect the piezoresistors 120-123 in a full Wheatstone bridge configuration. Note that the electrical conductors 150, 151, 152 and 153 constitute electrical conductors connecting the nodes of the wheatstone bridge to wirebond pads 155, 156, 157 and 158. Additionally, it is also important to note that conductor 145 is not unique. That is, there are several other conductors that can be utilized to connect the piezoresistors 120-123 to the Wheatstone bridge configuration, not just the conductor 145, which is discussed herein as a representative component.

The electrical conductor 145 can be utilized to provide electrical connection to the wirebond pads 1556 156, 157 and 158 through electrical conductors 150, 151, 152 and 153. The electrical conductor 145 including associated electrical connections and electrical conductors 160-153 preferably are formed by any of the well-known metalization techniques currently in commercial use. Preferably the leads are either gold, preferably over a chromium adhesion layer, or aluminum. Alternative metals will be apparent to those skilled in the art in view of the present disclosure for particular applications in which the sensor is to be used.

Figure 4:
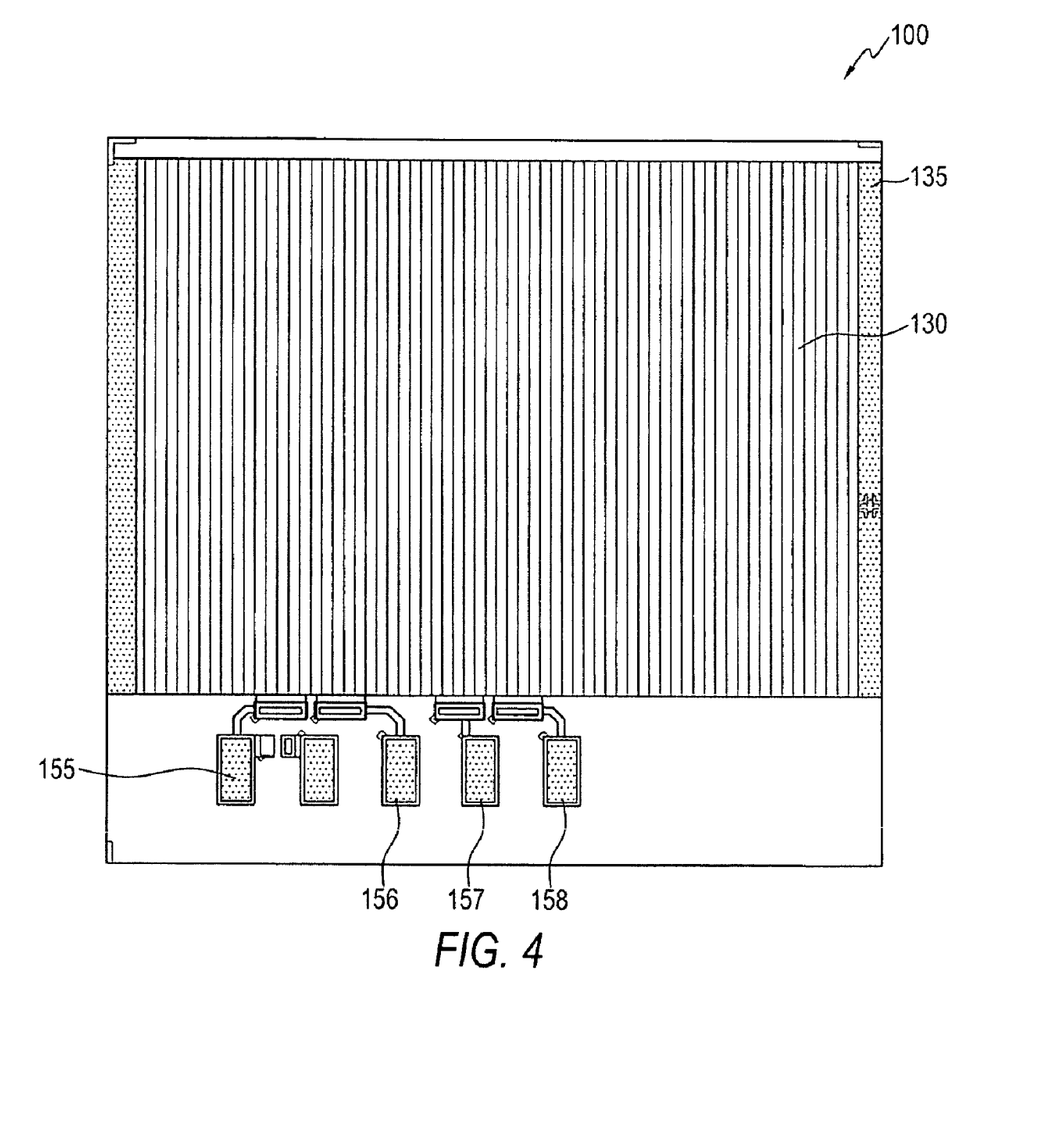
FIG. 4 illustrates a top view of single differential pressure sense die with the top cap, in accordance with a preferred embodiment.

Referring to FIG. 4 a top view of single differential pressure sense die 100 with a top cap is illustrated, in accordance with a preferred embodiment. Note that in FIGS. 1-6, identical or similar blocks and elements are generally indicated by identical reference numerals. As shown in FIG. 4 the top cap 130 made of glass or silicon can be attached to the pressure sense die 100 with an anodic bonding process or glass frit process thereby entrapping a reference volume of gas. A sensed media can be applied to the pressure sense die 100. The top cap 130 prevents piezoelectric network 160, electrical conductive lead 145, and electrical conductors 150, 151, 152 and 153 associated with the front side 105 of the pressure sense die 100 from exposure to sensed media and attack from acids and abrasive chemicals associated with the sensed media.

Figure 5:
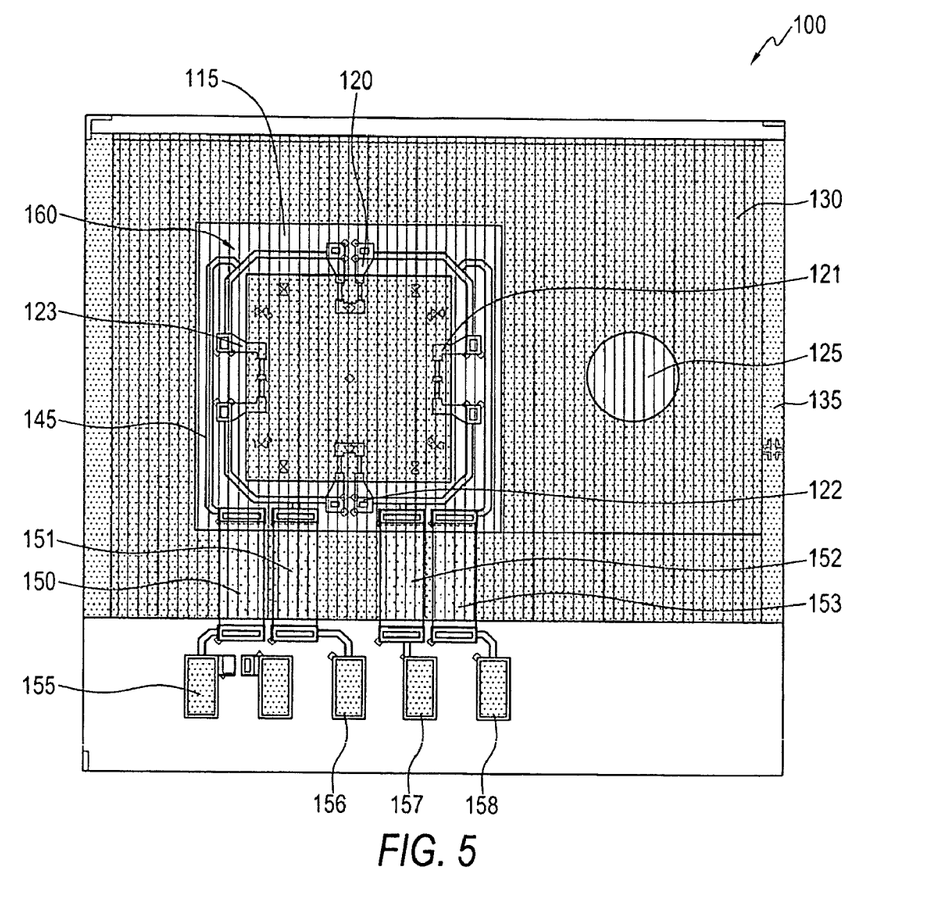
FIG. 5 illustrates a top view of an over-all single differential pressure sense die configuration, in accordance with a preferred embodiment.

Referring to FIG. 5, a top view of an over-all single differential pressure sense die configuration is illustrated, in accordance with a preferred embodiment. The piezoelectric network 160 can sense the flexing of the diaphragm 115 and provides a variable resistance path as a function of the applied differential pressure P1 and P2 for the direct current induced by a voltage applied between the conductive lead 145. The diaphragm 115 of sensor die 100 flexes upon application of a differential pressure P2 and the absolute reference pressure P1. The differential pressure P2 causes a change in the resistance film of piezoelectric network 160 and results in a corresponding change in the current flow in the respective resistors 120-123. Current tap points or electrical connections are made along the conductive lead 145 of piezoelectric network 160. The electrical connections are defined at the juncture of the attachment point of the conductive lead 145 and pressure sense die 100 at electrical conductors 150-153.

The change in current flow appears as a potential difference on current taps of piezoelectric network 160. Thus, piezoelectric network 160 measures the differential pressure P2 and the reference pressure P1 applied through hole 125 and provides an electrical signal representative of that differential pressure P2 through conductive lead 145, electrical conductors 150-153 and connectors 155-158 for transmission to other receiving circuitry for evaluation (not shown). The piezoresistors 120-123 can be formed on upper surface of the sense die 100. The resistors 120-123 can be formed in accordance with well-known metalization techniques of any material having suitable thin film resistance properties and suitable deposition characteristics. Preferably the resistors 120-123 are formed of nickel or platinum. Additional processing or treatment apparent to those skilled in the art can be applied to the surface of pressure sense die 100 to improve robustness with respect to media compatibility and potential ionic contamination. The conductive lead 145, and electrical conductors 150-153 are isolated from the sensed media completely.

Figure 6:
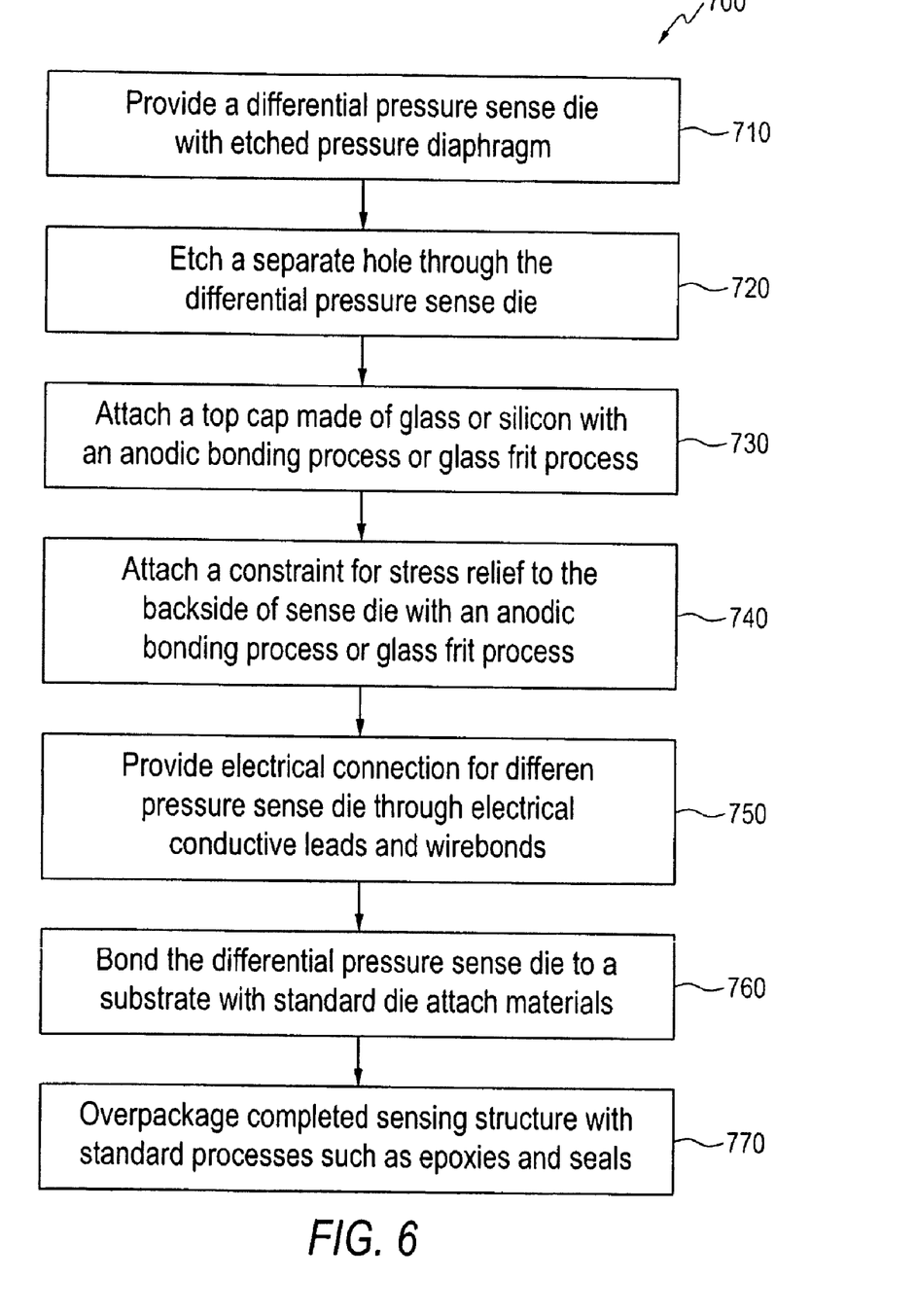
FIG. 6 illustrates another high level flow chart of operations illustrating logical operational steps of a method for designing unique silicon piezoresistive technology based differential pressure die, in accordance with an alternative embodiment.

Referring to FIG. 6 a high level flow chart of operations illustrating logical operational steps of a method 700 for designing silicon piezoresistive technology based differential pressure die 100 is illustrated, in accordance with an alternative embodiment. As indicated at block 710, a differential pressure sense die 100 with etched pressure diaphragm 115 can be provided. Next, as depicted at block 720, a separate hole 125 can be etched through the differential pressure sense die 100. Thereafter, as illustrated at block 730, a top cap 130 made of glass or silicon can be attached to the front side 105 of the sensing die 100 with an anodic bonding process or glass frit process thereby entrapping a reference volume of gas.

A constraint 135 for stress relief can be attached to the backside 110 of the sense die 100 with an anodic bonding process or glass frit, as described at block 740. Electrical connections for differential pressure sense die 100 can be provided through electrical conductive lead 145 and electrical conductors 150-153, as shown at block 750. The differential pressure sense die 100 can be bonded to a substrate 140 with standard die attach materials, as depicted at block 760. Finally as indicated at block 770, the completed sensing die 100 can be overpackaged with standard processes such as epoxies and seals. The electrically conductive lead 145 can be deposited using metal deposition techniques known in the art.

The method of designing unique silicon piezoresistive technology based differential pressure die 100 utilizes single sense die 100 to provide robust differential sensing solution capable of sensing low differential pressure on a high common mode pressure. This affords a low cost, compact, easy to implement technique and suited for use in harsh environments. The major advantage of this method is that the wirebonds and wirebond pads will not be exposed to the sensed media. The differential pressure sense die disclosed herein can therefore sense the low differential pressures on a high common mode pressure for EGR (Exhaust Gas Re-circulation) applications, DPS (Diesel Particulate Sensor) applications, and other mechanical and/or electromechanical devices and machines.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing a differential pressure sense die utilized in a pressure sensor, comprising:
configuring a pressure sense die having a pressure diaphragms, said pressure sense die comprising a back side and a front side, wherein said pressure sense die detects a plurality of varying pressures;
forming a piezoelectric sensing network upon said pressure diaphragm, wherein said piezoelectric sensing network comprises a plurality of piezoresistors, a conductor and a plurality of electrical conductors;
attaching a top cap over said front side utilizing a bonding process, wherein said top cap and said pressure sense die together form a reference pressure cavity therebetween;
forming a separate hole through said pressure sensing die into said reference pressure cavity to serve as a pressure inlet;
attaching a constraint to said back side utilizing said bonding process and applying a sensed media to said pressure sense die wherein said top cap prevents a plurality of wire bonds and active regions associated with said front side of said pressure sense die from exposure to said sensed media and attack from acids and abrasive chemicals associated with said sensed media;
measuring change in current flow through said plurality of piezoresistors wherein said change in current flow is caused by flexing of said diaphragm upon application of said plurality of varying pressures and is indicative of differential pressure.

2. The method of claim 1 further comprising:
bonding said pressure sense die to a substrate; and
overpackaging said pressure sense die utilizing epoxies and seals.

3. The method of claim 1 wherein said pressure sense die is formed from micromachined silicon with a plurality of piezoresistors in a Wheatstone bridge circuit and with said top cap and said plurality of wire bond pads for electrical connection to said bridge circuit.

4. The method of claim 1 wherein said pressure sense die comprises a piezoresistive pressure sense die.

5. The method of claim 1 wherein said bonding process comprises an anodic bonding process and a glass frit process.

6. The method of claim 1 wherein said top cap and said constraint comprises silicon and/or glass.

7. The method claim 1 wherein said plurality of piezoresistors comprises at least one of the following metals:
nickel and platinum.

8. The method claim 1 wherein said pressure sense die detects very low pressures with respect to a high common mode pressure in harsh duty applications.

9. The method claim 1 wherein said constraint provides stress isolation to said pressure sense die and said pressure diaphragm.

10. A differential pressure sensing apparatus, comprising:
a pressure sense die configured to include a pressure diaphragm, wherein said pressure sense die comprises a back side and a front side and detects a plurality of varying pressures;
a piezoelectric sensing network formed as a part of said pressure sense die, wherein said piezoelectric sensing network comprises a plurality of piezoresistors, a conductor and a plurality of electrical conductors;
a top cap bonded over said front side, wherein said top cap and said pressure sense die together form a reference pressure cavity therebetween;
a hole formed through said pressure sensing die into said reference cavity to serve as a pressure inlet; and
a constraint attached to said back side by a bond, wherein said top cap protects a plurality of wire bonds and active regions of said front side of said pressure sense die from exposure to a sensed media and attack from acids and abrasive chemicals of said sensed media.

11. The apparatus of claim 10 further comprising:
piezoresistive pressure die bonded to a substrate, wherein said piezoresistive pressure sense die overpackaged utilizing a standard packaging process that includes use of epoxies and seals.

12. The apparatus of claim 10 wherein said pressure sense die comprise micromachined silicon with a plurality of piezoresistors in a Wheatstone bridge circuit and said top cap and said plurality of wire bond pads for electrical connection to said bridge circuit.

13. The apparatus of claim 10 wherein said pressure sense die comprises a piezoresistive pressure sense die.

14. The apparatus of claim 10 wherein said bond comprises at least one of the following types of bonds: an anodic bond and a glass frit bond.

15. The apparatus of claim 10 wherein said top cap and said constraint comprise silicon and/or glass.

16. The apparatus claim 10 wherein said plurality of piezoresistors comprise a metal selected from at least one of the following types of metals: nickel and platinum.

17. The apparatus claim 10 wherein said pressure sense die detects very low pressures with respect to a high common mode pressure in harsh duty applications.

18. The apparatus claim 10 wherein said constraint provides stress isolation to said pressure sense die and said pressure diaphragm.

* * * * *